(12) United States Patent
Lan et al.

(10) Patent No.: US 7,671,499 B2
(45) Date of Patent: Mar. 2, 2010

(54) FAN, MOTOR AND BEARING STRUCTURE THEREOF

(75) Inventors: Chung-Kai Lan, Taoyuan Hsien (TW); Hung-Chi Chen, Taoyuan Hsien (TW); Te-Tsai Chuang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 363 days.

(21) Appl. No.: 11/802,026

(22) Filed: May 18, 2007

(65) Prior Publication Data

US 2007/0273229 A1 Nov. 29, 2007

(30) Foreign Application Priority Data

May 26, 2006 (TW) .............................. 95118730 A (51) Int. Cl.
*H02K 5/16* (2006.01)

(52) U.S. Cl. ..................................................... 310/90
(58) Field of Classification Search .................. 310/90, 310/58, 67 R; 415/211.2, 220
See application file for complete search history.

(56) References Cited

U.S. PATENT DOCUMENTS

2007/0041843 A1* 2/2007 Vasilescu et al. ......... 416/244 R

\* cited by examiner

*Primary Examiner*—Javaid Nasri
(74) *Attorney, Agent, or Firm*—Birch, Stewart, Kolasch & Birch, LLP (57) ABSTRACT

A bearing structure, which is cooperated with a shaft, includes a housing, a bearing, an elastic element and a blocking element. The shaft passes through the bearing. The elastic element presses against the bearing to provide a pre-stress to the bearing. The blocking element is apart from the bearing by a predetermined distance.

20 Claims, 7 Drawing Sheets

FAN, MOTOR AND BEARING STRUCTURE THEREOF

CROSS REFERENCE TO RELATED APPLICATIONS

This Non-provisional application claims priority under 35 U.S.C. §119(a) on Patent Application No(s). 095118730 filed in Taiwan, Republic of China on May 26, 2006, the entire contents of which are hereby incorporated by reference.

BACKGROUND OF THE INVENTION

1. Field of Invention

The invention relates to a fan, a motor and a bearing structure thereof. In particular, the invention relates to a fan, a motor and its bearing structure that provides a pre-stress to the bearing.

2. Related Art

In the modem information era, electronic equipment has become an indispensable part of daily life and work. Motors in particular are widely used in various electronic devices to effectively convert electrical energy into mechanical energy.

Figure 1:
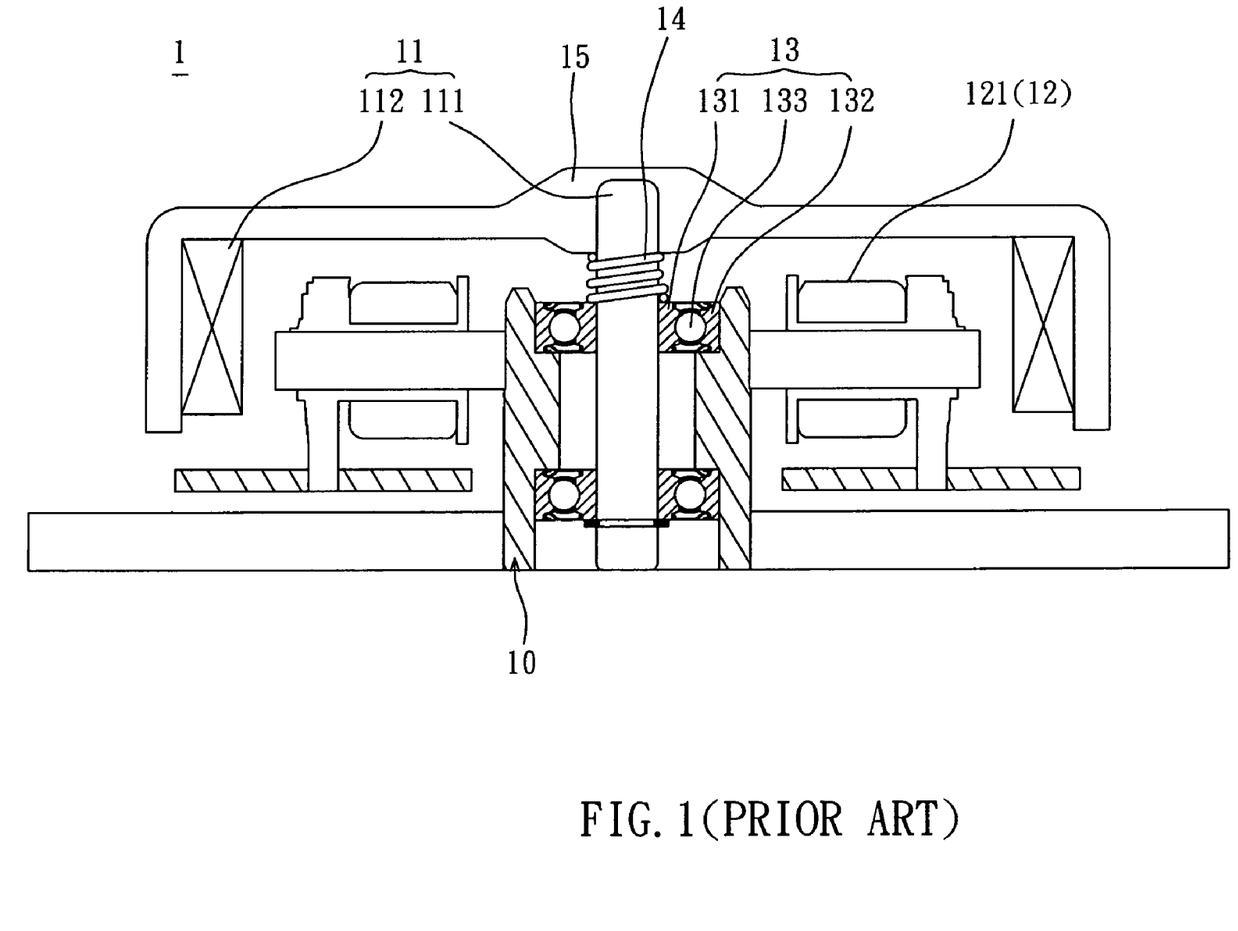
FIG. 1 is a sectional view of a conventional brushless motor.

There are many types of motors. FIG. 1 shows a conventional brushless motor 1. The brushless motor 1 includes a housing 10, a rotor structure 11 and a stator structure 12. The rotor structure 11 has a shaft 111 passing through the housing 10. The stator structure 12 has a coil set 121, which fits around with the housing 10. An annular magnet 112 of the rotor structure 11 is disposed corresponding to the coil set 121. The interaction between the coil set 121 and the magnet 112 generate an alternated magnetic field to rotate the rotor structure 11.

Figure 2:
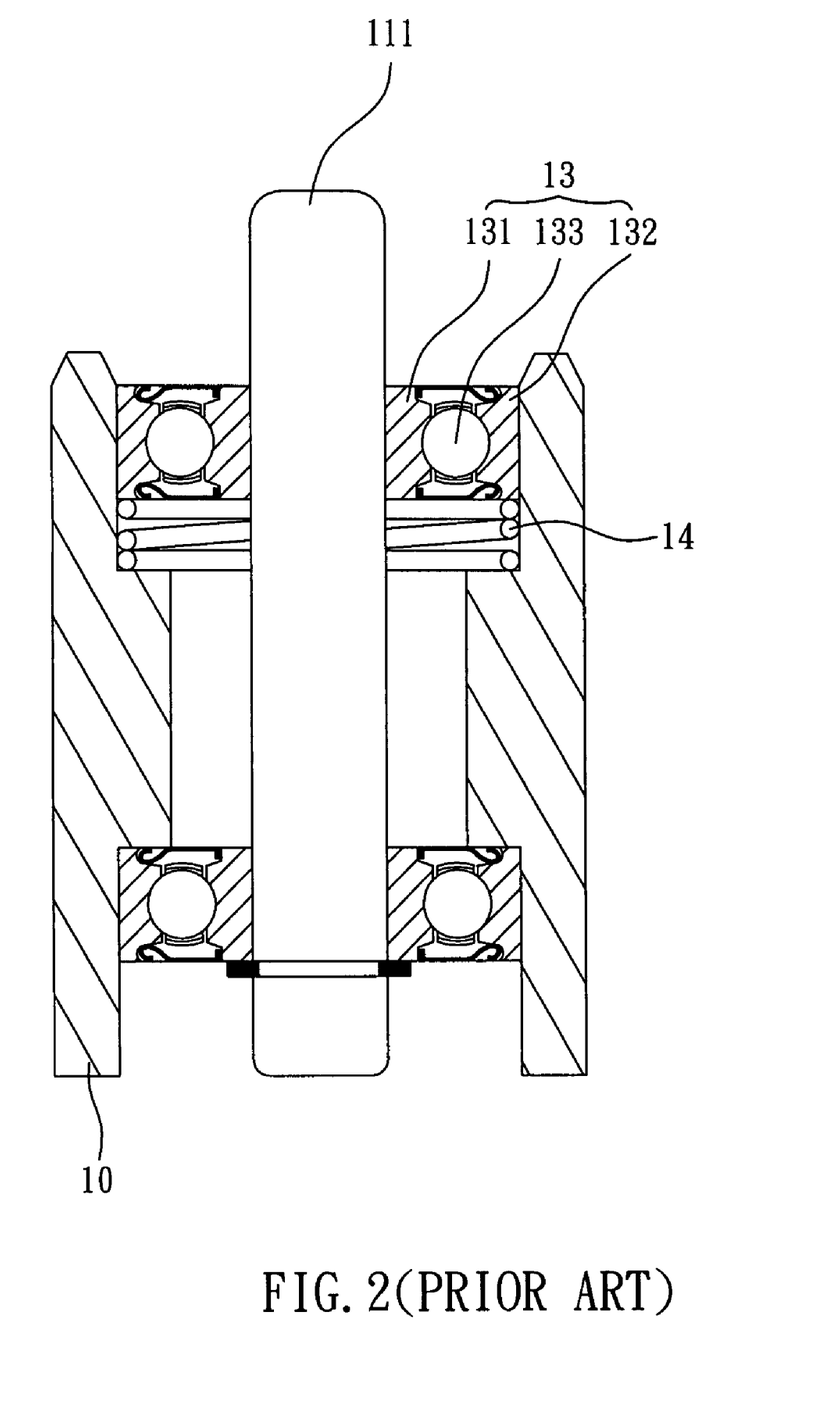
FIG. 2 is a sectional view of a conventional bearing with a pre-stress structure.

To make the motor 1 operate smoothly, a bearing 13 is generally used to cover the shaft 111. Consequently, the shaft 111 rotates well with the support of the bearing 13. As well, the bearings 13 can be classified into ball bearings, sleeve bearings and sliding bearings according to the structures thereof. Take the ball bearing as an example that has an inner ring 131, an outer ring 132 and a ball 133. The inner ring 131 is mounted on the shaft 111. The outer ring 132 is connected to the housing 10. The ball 133 is disposed between the inner ring 131 and the outer ring 132. In order to make the shaft 111 run more smoothly with the support of the bearing 13, the motor 1 further includes an elastic element 14 disposed between the bearing 13 and a cover 15. As shown in FIG. 1, the elastic element 14 presses against the inner ring 131 of the bearing 13 to provide a pre-stress to the bearing 13 so as to make the ball 133 of the bearing 13 maintains linear contact with the inner ring 131 and the outer ring 132 simultaneously. This mechanism buffers the axial load variation to the bearing 13 under the high-speed rotation of the shaft 111, thereby elongating the lifetime of the motor 1. According to the different configurations, the elastic element 14 can press against the outer ring 132 of the bearing 13 as well that provides pre-stress on the bearing 13 as shown in FIG. 2.

However, a spring is used as the elastic element 14 generally. After a long-time use of the motor 1, the continuous pressure imposed on the bearing 13 is easy to cause elastic fatigue for the elastic element 14. This seriously shortens the lifetime of use of the motor 1.

Therefore, it is an important subject to provide a fan, a motor and a bearing structure thereof that can provide a pre-stress to the bearing and prevent the elastic element from being overly pre-stressed and damaged.

SUMMARY OF THE INVENTION

In view of the foregoing, the invention is to provide a fan, a motor and a bearing structure thereof that can provide a pre-stress to the bearing and prevent the elastic element from being overly pre-stressed and damaged.

To achieve the above, the invention discloses a bearing structure, which cooperates with a shaft and is disposed in a housing. The bearing structure includes a bearing, an elastic element and a blocking element. The shaft passes through the bearing, and the elastic element presses against the bearing to provide a pre-stress to the bearing. The blocking element is separated from the bearing by a predetermined distance.

To achieve the above, the invention discloses a motor, which includes a housing, a rotor structure, a stator structure and a bearing structure. The rotor structure has a shaft passing through the housing. The stator structure is disposed corresponding to the rotor structure and is fit with the housing. The bearing structure, which cooperates with the shaft and is disposed in the housing. The bearing structure includes a bearing, an elastic element and a blocking element. The shaft passes through the bearing, and the elastic element presses against the bearing to provide a pre-stress to the bearing. The blocking element is separated from the bearing by a predetermined distance.

To achieve the above, the invention discloses a fan, which includes an impeller, a housing, a rotor structure, a stator structure and a bearing structure. The impeller includes a hub and a plurality of blades disposed around the hub. The rotor structure has a shaft, which passes through the housing and connects to the hub. The stator structure is disposed corresponding to the rotor structure and is fit with the housing. The bearing structure, which cooperates with the shaft and is disposed in the housing. The bearing structure includes a bearing, an elastic element and a blocking element. The shaft passes through the bearing, and the elastic element presses against the bearing to provide a pre-stress to the bearing. The blocking element is separated from the bearing by a predetermined distance.

As mentioned above, the invention discloses a fan, a motor and a bearing structure thereof. The blocking element is separated from the bearing by a distance. The elastic element presses against the bearing. The blocking element has a recess for accommodating the elastic element. Therefore, if the shaft of the motor or fan rotates at a high-speeded rotation and moves toward an axial direction, the elastic element provides a pre-stress to the bearing. The blocking element is used to prevent from doing excessively the pre-stress on the elastic element if the bearing is impacted. This effectively prevents the elastic element, such as a spring, from being damaged during the impact. Therefore, the invention can provide a better protection for the bearing structure and elongate the lifetime thereof.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
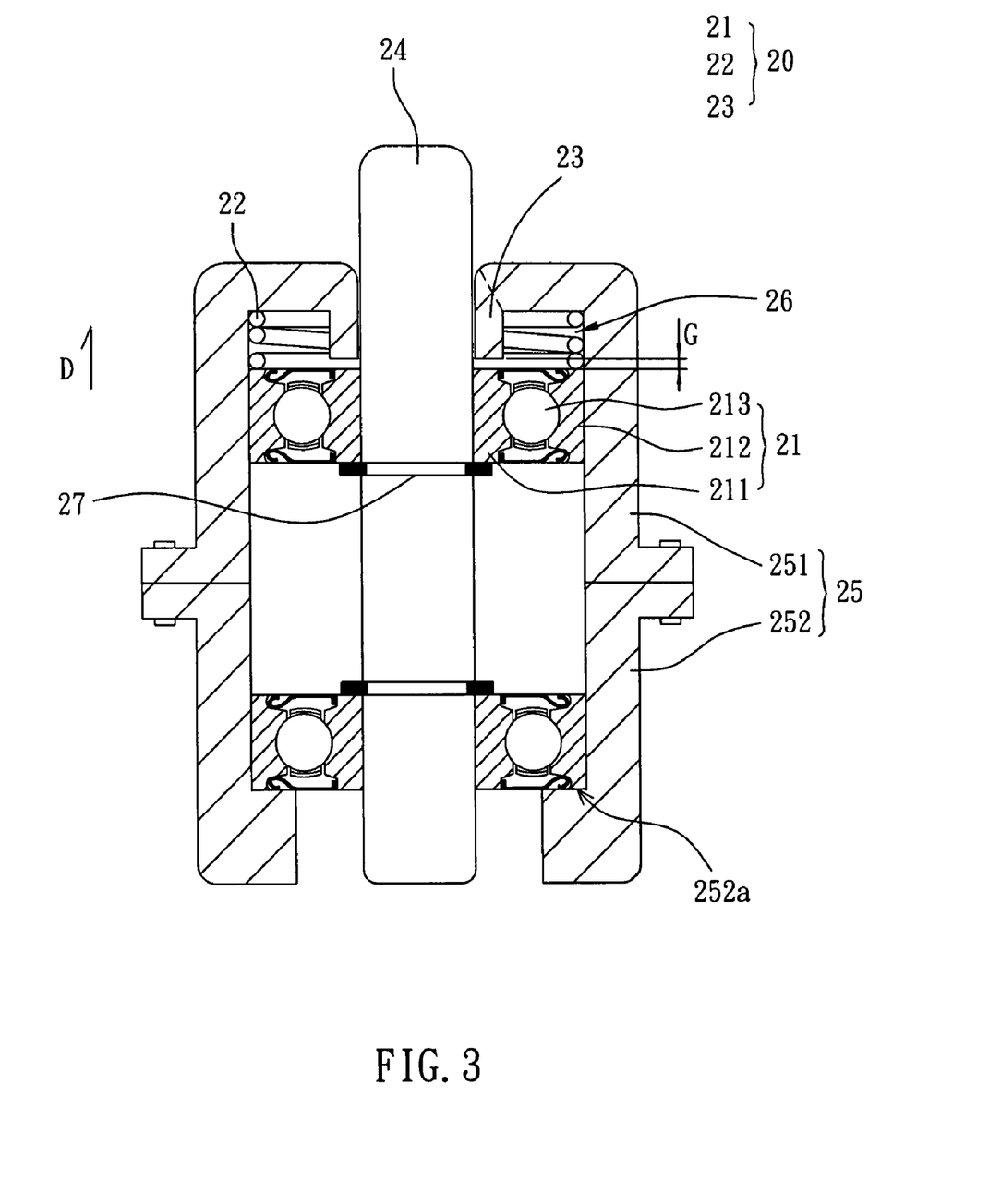
FIGS. 3 and 4 are sectional views of a bearing structure according to a preferred embodiment of the invention.

As shown in FIG. 3, a bearing structure 20 according to a preferred embodiment of the invention includes a bearing 21, an elastic element 22 and a blocking element 23. The bearing structure 20 is cooperated with a shaft and is disposed in a housing 25. The housing 25 consists of a first housing 251 and a second housing 252.

The shaft 24 passes through the bearing 21. In this embodiment, the bearing 21, such as a ball bearing, includes an inner ring 211, an outer ring 212 and a ball 213. The inner ring 211 is fit with the shaft 24. The outer ring 212 is connected to the first housing 251. The ball 213 is disposed between the inner ring 211 and the outer ring 212.

The elastic element 22 presses against the bearing 21 to provide a pre-stress to the bearing 21. In this embodiment, the elastic element 22 is, for example, a spring or a flexible sleeve.

The blocking element 23 is disposed adjacent to the bearing 21 and connected to one end of the first housing 251 or alternatively integrated with the first housing 251. In this embodiment, the blocking element 23 and the first housing 251 can be integrally formed by die casting or injection molding. A recess 26 is formed between the blocking element 23 and the first housing 251 to accommodate the elastic element 22. One end of the blocking element 23 is separated from the bearing 21 by a predetermined distance G If the shaft 24 rotates and moves toward an axial direction D, the bearing 21 is pulled toward the elastic element 22 so as to depress the elastic element 22. That is, the gap between the inner ring 211, the outer ring 212 and the ball 213 of the bearing 21 is eliminated by the elastic restoring force produced from the elastic element 22. The blocking element 23 is used to press against the bearing 21, particularly to the inner ring 211, to prevent the bearing 21 from doing excessively the pre-stress of the elastic element 22. The elastic fatigue of elastic element 22, which shortens the lifetime of the bearing 21, is thus avoided. The blocking element 23 presses against the inner ring 211 of the bearing 21 is only an example, and the invention is not limited to this. According to the actual design, the blocking element 23 is pressed against the outer ring 212 to achieve the purpose of preventing from doing excessively the pre-stress on the elastic element 22 as well.

Figure 4:
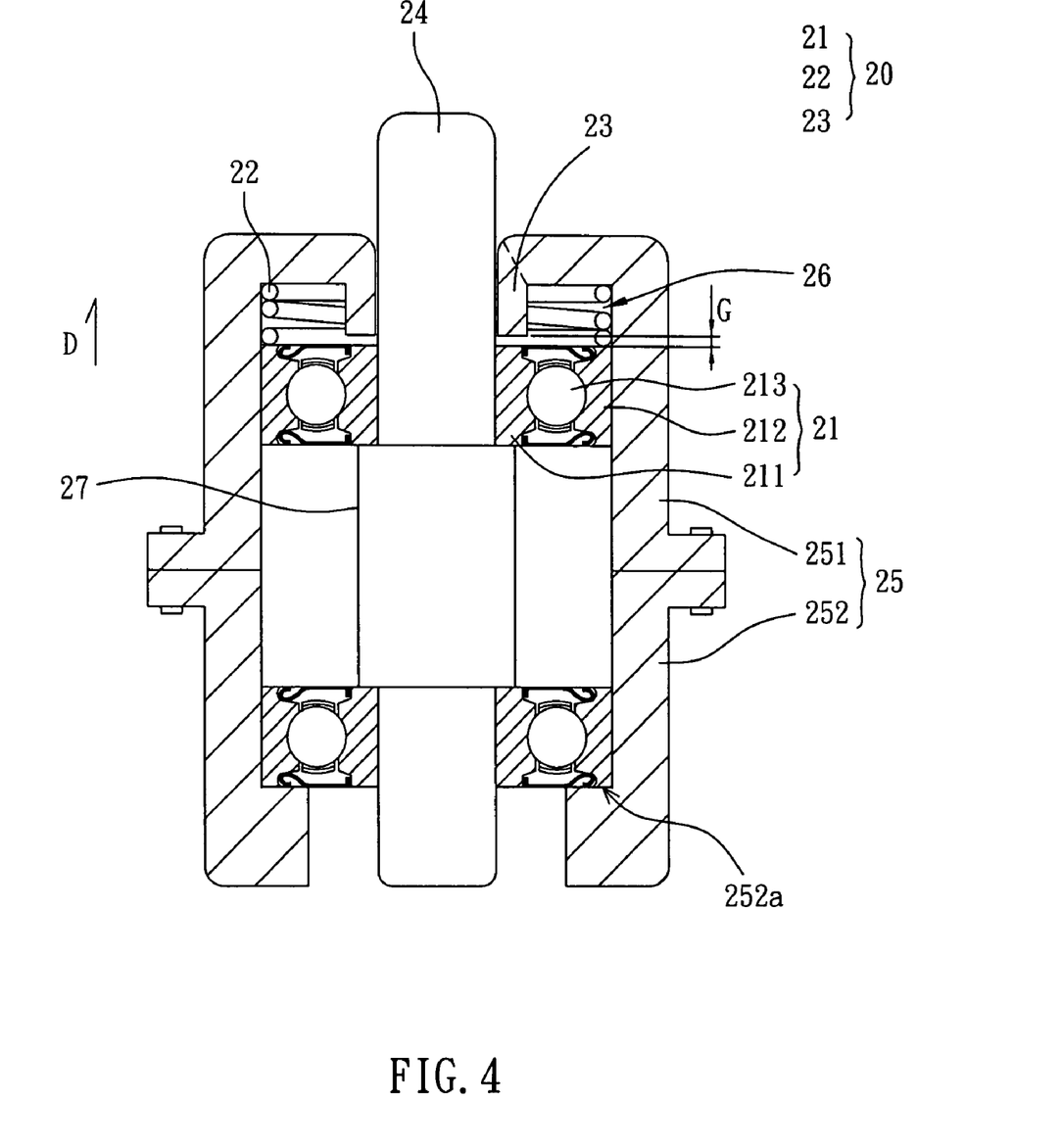

The bearing structure 20 in this embodiment further includes a positioning structure 27, disposed on the other side of the bearing 21 opposite to the pre-stress direction to press against and position the bearing 21. As shown in FIG. 3, the positioning structure 27 is a positioning element mounted on the shaft 24. The positioning element is, for example, a positioning plate as shown in FIG. 3. Alternatively, it can be a cylinder as shown in FIG. 4. In addition, the positioning structure 27 can be a protrusion from the shaft 24 or a turning part 252*a* of the second housing 252, not shown in drawing.

Figure 5:
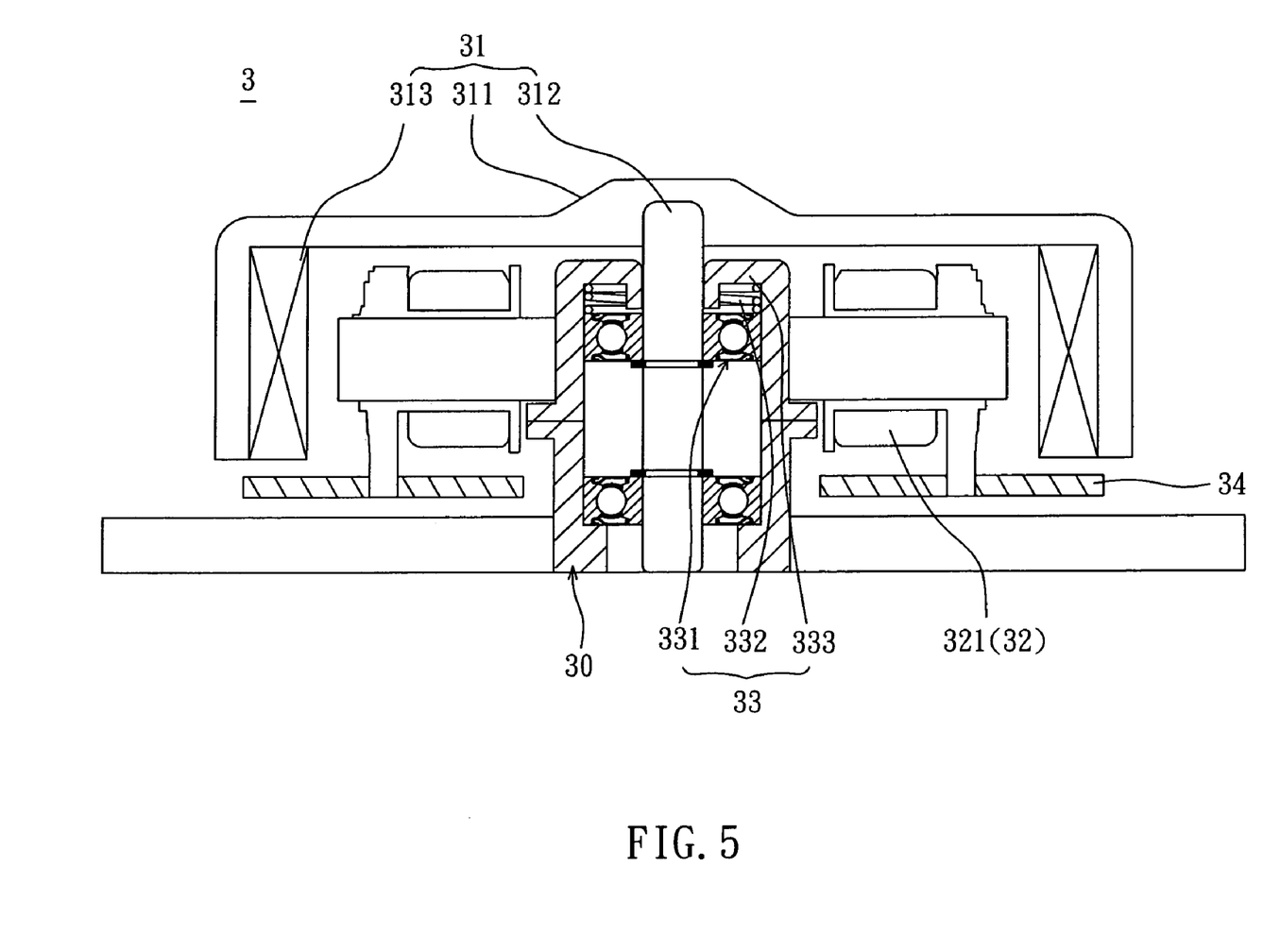
FIG. 5 is a sectional view of a motor according to the preferred embodiment of the invention.

As shown in FIG. 5, the motor 3 according to a preferred embodiment of the invention includes a housing 30, a rotor structure 31, a stator structure 32 and a bearing structure 33. In the embodiment, the housing 30 is, for example, a bearing sleeve.

In this embodiment, the motor 3 is implemented as a brushless motor. Of course, this is only one example of the invention, and the invention s not limited to this. The motor 3 is a brush motor or any type of motor as well.

The rotor structure 31 includes a cover 311, a shaft 312 and a magnet 313. The shaft 312 connects to the cover 311. The magnet 313 is disposed around the inner sidewall of the cover 311. The rotor structure 31 is disposed inside the housing 30, and the shaft 312 passes through the housing 30. Herein, the housing 30 can be a bearing sleeve (as shown in FIG. 5). Besides, according to the actual design of the motor, the housing 30 can be a base or a housing of the motor 3 (not shown in drawing). The motor 3 is an inner-rotor type motor.

The stator structure 32 includes a stator magnetic pole 321 disposed in the housing 30. The stator magnetic pole 321 is formed by a coil set and disposed corresponding to the rotor structure 31, particularly to the magnet 313. A circuit board 34 is disposed in the housing 30 and electrically connected to the stator magnetic pole 321 in order to control the current direction of the stator magnetic pole 321. Therefore, a rotating magnetic field is alternately produced to rotate the rotor structure 31.

The bearing structure 33 is disposed in the housing 30 and fits with the shaft 312. In the embodiment, the bearing structure 33 includes a bearing 331, an elastic element 332 and a blocking element 333.

Since the relative positions, structure features, constituent materials and functions of the components in the bearing structure 33 of this embodiment are the same as those in the previous embodiment, the descriptions are omitted herein.

Figure 6:
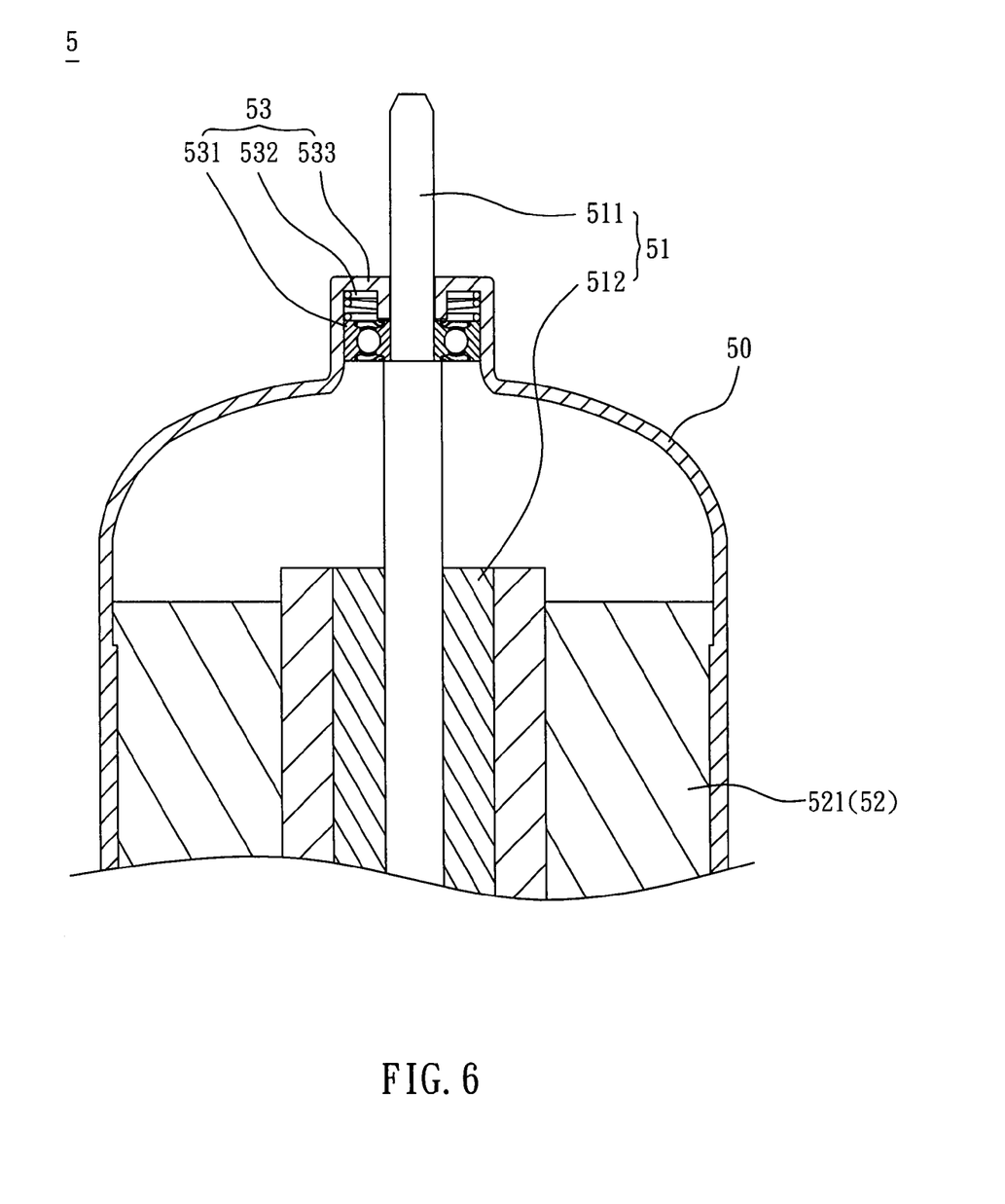
FIG. 6 is a sectional view of a motor according to another embodiment.

In this embodiment, the motor 3 is implemented as a brushless motor, a brush motor or other types of motor. As shown in FIG. 6, the bearing structure of the invention can be used in an inner-rotor type motor 5. The motor 5 includes a housing 50, a rotor structure 51, a stator structure 52 and a bearing structure 53. The stator structure 52 includes a permanent magnet 521, and the rotor structure 51 includes a shaft 511 and a silicon steel set 512. The shaft 511 passes through the housing 50, and the silicon steel set 512 is fixed to the shaft 511. The silicon steel set 512 is wound with a coil and corresponded to the permanent magnet 521. Because the primary driving structure of the inner-rotor type motor 5 is well-known in the prior art, the rotor structure 51 and the stator structure are not further described herein.

The bearing structure 53 is disposed inside the housing 50 and includes a bearing 531, an elastic element 532 and a blocking element 533. Herein, the housing 50 is the outer case of the inner-rotor type motor 5 and cooperates with the shaft 511. Likewise, the relative positions, structure features, constituent materials and functions of the components in the bearing structure 53 of this embodiment are the same as those in the previous embodiments, the detailed descriptions are omitted.

Figure 7:
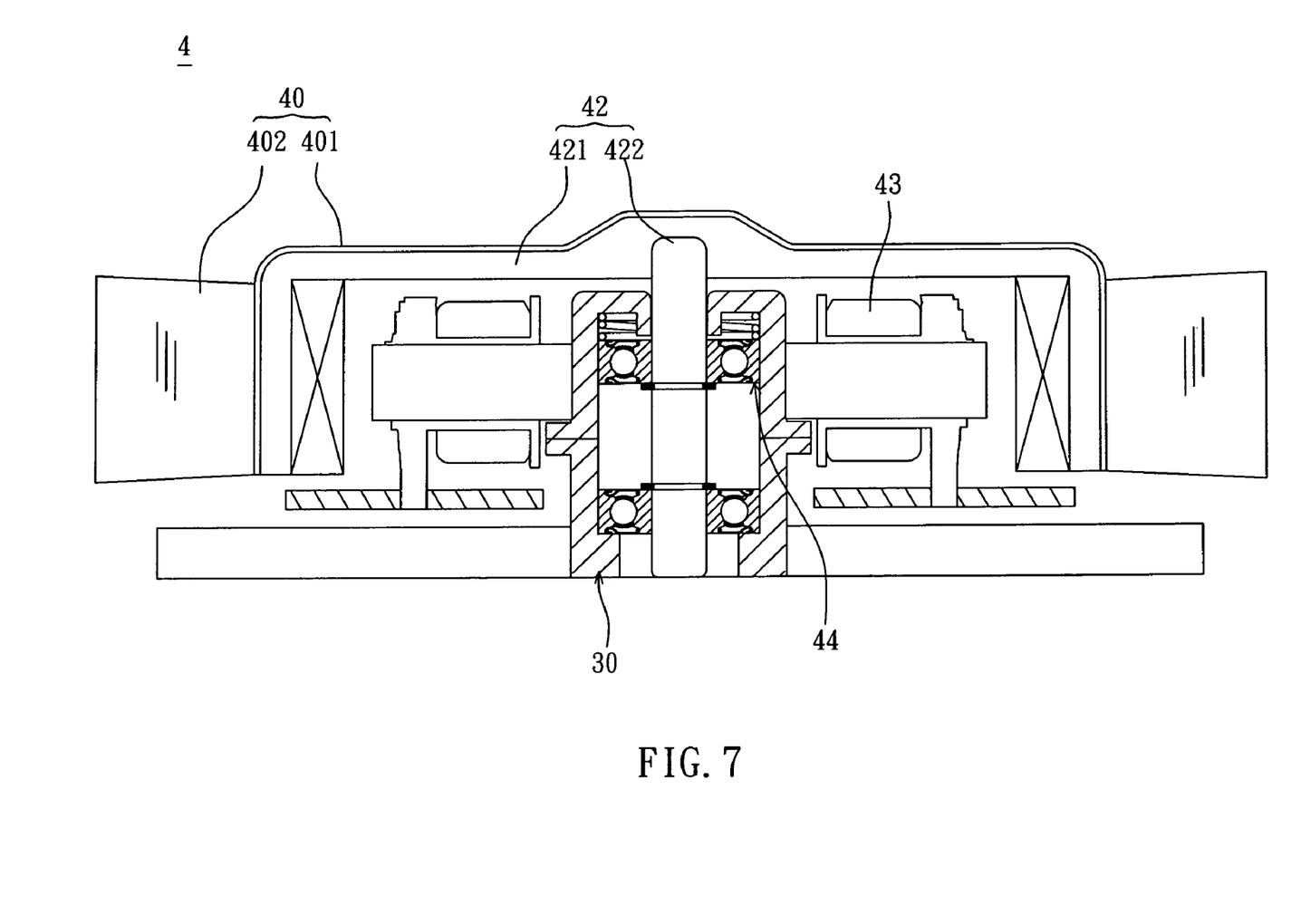
FIG. 7 is a sectional view of a fan according to the preferred embodiment of the invention.

As shown in FIG. 7, a fan 4 according to a preferred embodiment of the invention includes an impeller 40, a housing 41, a rotor structure 42, a stator structure 43 and a bearing structure 44.

Since the structure features, relative positions, constituent materials and functions of the components in the housing 41, the rotor structure 42, the stator structure 43 and the bearing structure 44 are the same as those in the previous embodiments, the detailed descriptions are omitted.

In this embodiment, the impeller 40 includes a hub 401 and several blades 402. The blades 402 are disposed around the hub 401. As shown in FIG. 7, the hub 401 is a cover 421 connected to the rotor structure 42, and a shaft 422 is connected to the hub 401. When the shaft 422 rotates, the blades 402 are driven to generate airflow.

In summary, the invention discloses a fan, a motor and a bearing structure thereof. The blocking element is separated from the bearing by a distance. The elastic element presses against the bearing. The blocking element has a recess for accommodating the elastic element. Therefore, when the shaft of the motor or fan rotates at a high speed and moves in an axial direction, the elastic element provides a pre-stress to the bearing. The blocking element is used to prevent the bearing from imposing excess pre-stress on the elastic element under impact. This effectively prevents the elastic element, such as a spring, from being damaged during the impact. Therefore, the invention can provide better protection for the bearing structure and lengthen the lifetime thereof.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A bearing structure cooperating with a shaft, the bearing structure comprising:
    a housing;
    a bearing disposed inside the housing, wherein the shaft passes through the bearing;
    an elastic element disposed inside the housing and urging against the bearing for providing a pre-stress to the bearing; and
    a blocking element, wherein one end of the blocking element extends toward the bearing, and another end of the blocking element is connected to the housing so that a recess is formed between the blocking element and the housing for accommodating the elastic element, wherein the blocking element is separated from the bearing by a predetermined distance,
    wherein the blocking element urges against an inner ring of the bearing when the shaft rotates and moves in an axial direction thereof.

2. The bearing structure of claim 1, wherein the blocking element and the housing are integrally formed as a single piece.

3. The bearing structure of claim 1, wherein the elastic element is a spring or a telescopic sleeve.

4. The bearing structure of claim 1, wherein the bearing is a ball bearing.

5. The bearing structure of claim 1, further comprising a positioning structure for positioning the bearing.

6. The bearing structure of claim 5, wherein the positioning structure is a positioning plate, a positioning element or a cylinder telescoped onto the shaft, or the positioning structure is a protruding part or a turning part of the shaft.

7. The bearing structure of claim 1, wherein the housing comprises a first housing and a second housing, and the blocking element abuts on the bearing and is connected to one end of the first housing.

8. The bearing structure of claim 7, wherein the blocking element and the first housing are integrally formed as a single piece by die casting or injection molding.

9. A motor comprising:
    a rotor structure having a shaft;
    a stator structure disposed corresponding to the rotor structure; and
    a bearing structure comprising:
        a housing;
        a bearing disposed inside the housing, wherein the shaft passes through the bearing;
        an elastic element disposed inside the housing and urging against the bearing for providing a pre-stress to the bearing; and
        a blocking element, wherein one end of the blocking element extends toward the bearing, and another end of the blocking element is connected to the housing so that a recess is formed between the blocking element and the housing for accommodating the elastic element, wherein the blocking element is separated from the bearing by a predetermined distance,
        wherein the blocking element urges against an inner ring of the bearing when the shaft rotates and moves in an axial direction thereof.

10. The motor of claim 9, wherein the blocking element and the housing are integrally formed as a single piece.

11. The motor of claim 9, wherein the elastic element is a spring or a telescopic sleeve.

12. The motor of claim 9, wherein the bearing is a ball bearing.

13. The motor of claim 9, further comprising a positioning structure for positioning the bearing.

14. The motor of claim 13, wherein the positioning structure is a positioning plate, a positioning element or a cylinder telescoped onto the shaft, or the positioning structure is a protruding part or a turning part of the shaft.

15. The motor of claim 9, wherein the housing comprises a first housing and a second housing, and the blocking element abuts on the bearing and is connected to one end of the first housing.

16. The motor of claim 15, wherein the blocking element and the first housing are integrally formed as a single piece by die casting or injection molding.

17. A fan comprising:
    an impeller having a hub and a plurality of blades disposed around the hub;
    a rotor structure having a shaft connected to the hub;
    a stator structure disposed corresponding to the rotor structure; and
    a bearing structure comprising:
        a housing;
        a bearing disposed inside the housing, wherein the shaft passes through the bearing;
        an elastic element disposed inside the housing and urging against the bearing for providing a pre-stress to the bearing; and
        a blocking element, wherein one end of the blocking element extends toward the bearing, and another end of the blocking element is connected to the housing so that a recess is formed between the blocking element and the housing for accommodating the elastic element, wherein the blocking element is apart from the bearing by a predetermined distance,
        wherein the blocking element urges against an inner ring of the bearing when the shaft rotates and moves in an axial direction thereof.

18. The fan of claim 17, wherein the elastic element is a spring or a telescopic sleeve.

19. The fan of claim 17, further comprising a positioning structure for positioning the bearing, wherein the positioning structure is a positioning plate, a positioning element or a cylinder telescoped on the shaft, or the positioning structure is a protruding part or a turning part of the shaft.

20. The fan of claim 17, wherein the housing comprises a first housing and a second housing, the blocking element abuts on the bearing and is connected to one end of the first housing, and the blocking element and the first housing are integrally formed as a single piece by die casting or injection molding.

* * * * *